June 4, 1940.  F. HOLLMANN  2,203,147
MEASURING AND TESTING INSTRUMENT FOR OXYGEN BREATHING APPARATUS
Filed Jan. 21, 1938
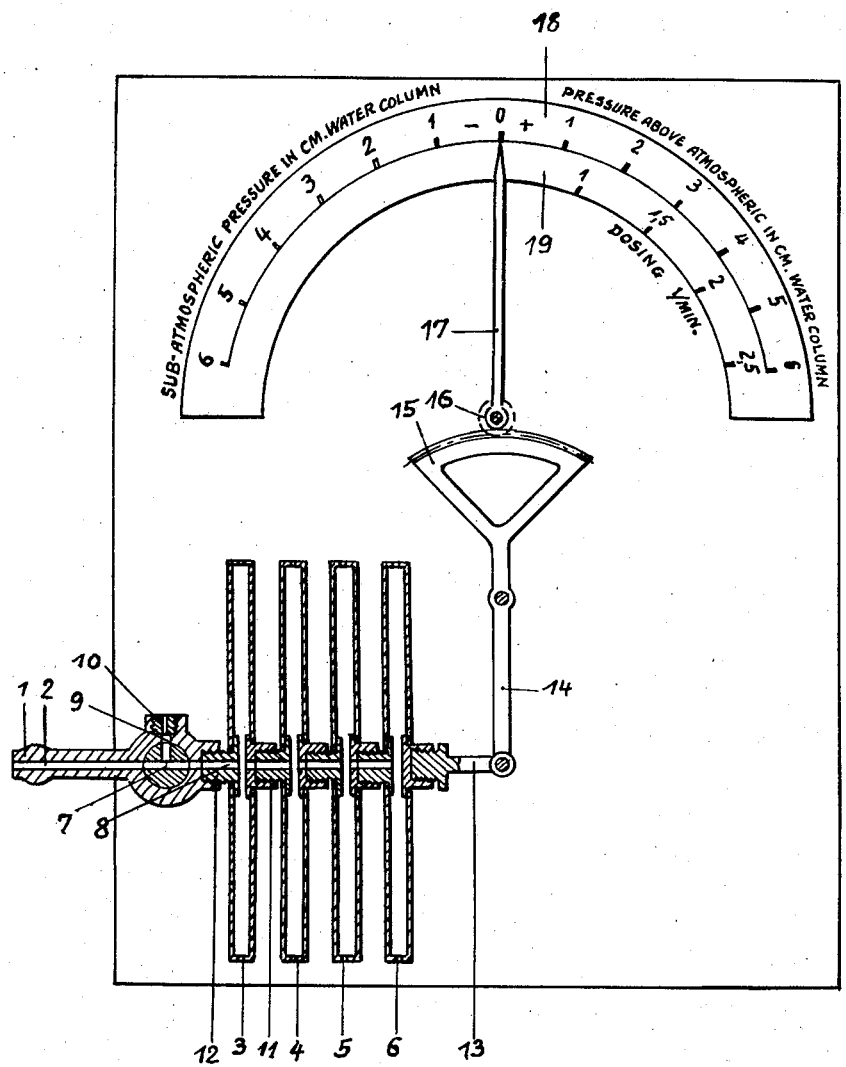
INVENTOR
FRANZ HOLLMANN
BY
Richards & Geier
ATTORNEYS Patented June 4, 1940

2,203,147

UNITED STATES PATENT OFFICE 2,203,147

MEASURING AND TESTING INSTRUMENT FOR OXYGEN BREATHING APPARATUS

Franz Hollmann, Lubeck, Germany, assignor to Otto Heinrich Dräger, Lubeck, Germany Application January 21, 1938, Serial No. 186,075
In Germany January 22, 1937

1 Claim. (Cl. 73—51)

This invention relates to an instrument for testing the tightness of oxygen breathing apparatus and for measuring the amount of oxygen supplied to heating apparatus per unit of time. The kind of apparatus to which the invention relates is that in which, by turning a multiple-way cock, a pressure measuring device is placed in communication with the apparatus to be tested either directly with the apparatus alone for testing its tightness, or both with the apparatus as with a nozzle having an orifice of predetermined size, for measuring the quantity of oxygen supplied. In accordance with the invention the pressure measuring device consists of a number of flat membrane or diaphragm boxes which are connected in series and the movements of which are transmitted to a pointer.

The individual diaphragm boxes are preferably provided in the middle of the diaphragms with bored sockets and plugs of which the former are screw-threaded internally and the latter externally, so that the diaphragms of adjacent boxes can be air-tightly screwed together.

The last diaphragm box which transmits the movements of the pressure measuring device can be guided or rigidly connected to a pin which in turn is guided or is linked to a lever in such a manner that no lateral play can occur.

Measuring instruments for oxygen breathing apparatus must be extremely sensitive as the pressures to be measured are between about 1.006 and 0.994 atmospheres.

Hitherto, water or alcohol columns were almost exclusively employed for measuring these small pressure differences because they enable the measurements to be read off very accurately, particularly if the tube or column of liquid is mounted in an inclined position.

Measuring instruments utilizing columns of liquid are, however, too clumsy for use in mines or by fire brigades and the like, and further the liquid is often liable to escape during transport. It has therefore previously been proposed to employ a diaphragm box for measuring the pressures. In order, however, to obtain a deflection of the pointer which could be read with accuracy it was necessary to make the diaphragm boxes of large size. A very large magnification of the deflection of the diaphragm is nevertheless not possible because this detracts from the accuracy of the indication. Large bulky measuring instruments are also in many cases just as useless as instruments provided with liquid columns. A small but very thin diaphragm does indeed give a relatively large deflection of the pointer even with small pressures. If, however, it is subjected to a slight overload it undergoes a permanent deformation which, in most cases, makes the diaphragm useless or necessitates a fresh adjustment, or re-calibration of the instrument.

All these disadvantages are obviated by means of my new measuring and testing instrument.

The distance through which each individual diaphragm moves need only be small because the sum of all the distances is used for measuring purposes.

The new instrument has a further particular advantage that the diaphragm boxes are small and consequently the entire apparatus is very handy. Further the diaphragms can be made of relatively thick sheet metal up to 0.2 mm. in thickness and can therefore be subjected to considerable overloads but are nevertheless very sensitive. Finally, the indications given are very accurate since 1 mm. water column, which corresponds to $1/_{10,000}$ atm., can be read off without difficulty.

A measuring and testing instrument in accordance with the invention is illustrated diagrammatically by way of example in the accompanying drawing.

Referring to the drawing, a connecting piece 1 is provided with a bore 2 and serves for connecting the instrument to the breathing apparatus to be tested. Between the connecting piece 1 and the pressure measuring device which consists of the small diaphragm boxes 3, 4, 5 and 6 is interposed a three-way cock 7 by which, as shown in the drawing, the instrument is placed in communication with the diaphragm boxes through the passage 2 and the bore 8 and also through the passage 9 with a nozzle 10 having an orifice of predetermined size and thereby with the atmosphere.

If the three-way cock 7 is turned through an angle of 180° the breathing apparatus is placed in direct communication with the diaphragm boxes. The individual diaphragm boxes 3, 4, 5 and 6 are air-tightly connected together by the sockets and plugs 11 and 12 which are provided respectively with internal and external screw threads. The last diaphragm box 6 transmits the movement of the entire assembly by means of the rod 13 to the lever 14 and thereby to the sector 15 which moves the pointer 17 by means of the pinion 16. The pointer moves over two scales 18 and 19 of which the outer scale indicates the under-pressure or over-pressure in centimetres of water column while quantities in 1/min. can be read off on the inner scale.

For testing whether the excess pressure or safety valve is properly adjusted or is in working order, the three-way cock is rotated through an agle of 180° out of the position in which it is shown in the drawing. The apparatus to be tested is now in direct communication with the diaphragm boxes. After opening the oxygen cylinder of the breathing apparatus the pointer 17 of the pressure measuring instrument continues to move until the safety valve of the breathing apparatus blows-off. Then, by reading the pressure scale it is possible to determine whether the safety valve is working properly or needs overhauling or requires some other adjustment.

If the breathing apparatus is to be tested for tightness the three-way cock is allowed to remain in the position which has just been described, but in this case the safety valve of the breathing apparatus is made tight. Then the oxygen cylinder is again opened and as soon as the pointer 17 of the pressure measuring device has made a corresponding deflection the cylinder is again closed. The deflection of the pointer can be regulated, for example, so that 5 cm. water column is indicated on the scale 18. If then the pointer 17 does not move back during the course of one minute through more than one subdivision, corresponding, to 1 cm. water column, the breathing apparatus is practically tight.

For measuring the quantity of oxygen supplied to the breathing apparatus per unit of time, the three-way cock is turned to the right through an angle of 180° and thus comes into the position illustrated in the drawing. The oxygen cylinder is then opened. The breathing apparatus is now in communication with the diaphragm boxes and also through the nozzle 10 with the atmosphere. The measuring instrument consequently acts as a differential manometer. After the pointer becomes stationary at a definite value, the overpressure in front of the outlet nozzle is a function of the quantity of gas delivered by the oxygen supply in the unit of time since the external pressure remains constant. This can be read off directly on the scale 19 which is etched to read in litres per minute.

I claim:

In an instrument for testing oxygen-breathing apparatus and indicating the quantity of oxygen supplied to the apparatus per unit of time, a plurality of pressure-responsive hollow intercommunicating members connected in series, a hollow connecting piece adapted to be connected to the apparatus to be tested, a single valve interposed between said piece and said members and movable to a plurality of positions for selectively placing the interior of said hollow members in communication with the apparatus to be tested or simultaneously with said apparatus and the atmosphere, a scale having two series of divisions, one of said series being calibrated to indicate pressure and the other to indicate the quantity of oxygen supplied per unit of time, and indicator means controlled by the movements of said hollow members and adapted to move over said scales.

FRANZ HOLLMANN.